United States Patent
Robie

(10) Patent No.: US 6,746,702 B1
(45) Date of Patent: *Jun. 8, 2004

(54) METHOD OF PREPARING A SNACK PRODUCT FROM A COOKED CEREAL DOUGH

(75) Inventor: Steven C. Robie, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/544,349

(22) Filed: Apr. 6, 2000

Related U.S. Application Data

(63) Continuation-in-part of application No. 09/025,976, filed on Feb. 19, 1998, now Pat. No. 6,291,008.

(51) Int. Cl.$^7$ .............................. A23L 1/164; A23L 1/18
(52) U.S. Cl. ........................ 426/241; 426/289; 426/439; 426/440; 426/446; 426/516; 426/517; 426/559; 426/560
(58) Field of Search ................................. 426/241, 289, 426/439, 440, 446, 516, 517, 549, 559, 560

(56) References Cited

U.S. PATENT DOCUMENTS

| | | |
|---|---|---|
| 2,707,153 A | 4/1955 | Bettman |
| 2,876,160 A | 3/1959 | Schoch |
| 3,054,677 A | 9/1962 | Graham, Jr. et al. |
| 3,450,538 A | 6/1969 | Mckown et al. |
| 3,868,471 A | 2/1975 | Decelles et al. |
| 3,903,308 A | 9/1975 | Ode |
| 4,178,392 A | 12/1979 | Gobble et al. |
| 4,211,800 A | 7/1980 | Scharschmidt et al. |
| 4,561,347 A | 12/1985 | Zaitu |
| 4,790,996 A | 12/1988 | Roush et al. |
| 4,834,988 A | 5/1989 | Karwowski et al. |
| 4,988,521 A | 1/1991 | Fan |
| 5,026,689 A | 6/1991 | Ringe et al. |
| 5,137,745 A | 8/1992 | Zukerman et al. |

(List continued on next page.)

FOREIGN PATENT DOCUMENTS

| | | | |
|---|---|---|---|
| EP | 739593 A | | 10/1996 |
| GB | 668288 | | 3/1952 |
| GB | 1050307 | * | 12/1966 |
| WO | WO99 17622 A | | 4/1999 |
| WO | WO99 41998 A | | 8/1999 |

OTHER PUBLICATIONS

Matz, *The Chemistry and Technology of Cereals as Food and Feed*, AVI Publishing Co., pp. 483–490, 1959.*
Hoseney, *Principles of Cereal Science and Technology*, 2d ed., AACC Inc., pp. 335–342, 1986.*

*Primary Examiner*—Arthur L. Corbin
(74) *Attorney, Agent, or Firm*—John A. O'Toole; Everett G. Diederiks, Jr.; Douglas J. Taylor

(57) ABSTRACT

Methods for preparing puffed snack products from cooked cereal doughs, especially corn based, comprise deep fat frying cornucopia shaped pellets or half products. Methods for preparing such snack products include a steeping step of cut grain particles having a particle size of 0.5 to 2.5 mm with warm water to have a moisture content of at least 18%, short residence time cooking to form a cooked cereal dough such as in a twin screw extruder, second long residence time cooking step, extruding the cooked cereal dough into extrudate ropes, tempering while cooling the extrudate ropes, forming into pellets, drying the pellets, and puffing to form the finished snack products such as by deep fat frying. The present methods provide finished puffed pieces of equivalent texture and eating qualities to those prepared by traditional low shear extended cooking of grains in batch cookers. The present method can utilize less expensive and specialized equipment, can be practiced as a continuous process rather than batch or semi-continuous, and are more economic.

22 Claims, 1 Drawing Sheet

U.S. PATENT DOCUMENTS

| | | |
|---|---|---|
| 5,198,253 A | 3/1993 | Roskowiak et al. |
| 5,338,556 A * | 8/1994 | Schwab et al. ............. 426/241 |
| 5,368,870 A | 11/1994 | Efstathiou |
| 5,372,826 A | 12/1994 | Holtz et al. |
| 5,510,130 A | 4/1996 | Holtz et al. |
| 5,520,949 A | 5/1996 | Lewis et al. |
| 5,645,878 A | 7/1997 | Breslin et al. |
| 5,698,252 A | 12/1997 | Kelly et al. |
| 6,291,008 B1 * | 9/2001 | Robie et al. ................ 426/439 |

* cited by examiner

METHOD OF PREPARING A SNACK PRODUCT FROM A COOKED CEREAL DOUGH

CROSS-REFERENCE TO RELATED APPLICATION

This patent application is a continuation-in-part application of commonly assigned U.S. Ser. No. 09/025,976, filed on Feb. 19, 1998, now U.S. Pat. No. 6,291,008, and incorporated herein by reference.

A commonly assigned application Ser. No. 09/415,615, filed on Oct. 8, 1999, now U.S. Pat. No. 6,174,556, contains subject matter related to this application and which subject matter is incorporated herein by reference.

FIELD OF THE INVENTION

The present invention relates to food products and to their methods of preparation. More particularly, the present invention relates to improved methods of preparing puffed snack products prepared from cooked cereal.

BACKGROUND

Parent application U.S. Ser. No. 09/025,976 is directed principally towards ready-to-eat cereal products especially in flake form that are characterized in part by a preferred visual appearance imparted by being fabricated from cooked cereal doughs having discernable grain pieces dispersed therethrough. These cooked cereal doughs are prepared by cooking under extended times but with low shear in cooker extruders involving a first short cook step and a second long cook step. However, in one embodiment, improved cooked cereal doughs are taught that are similarly prepared with sequenced short and long cook steps each with low shear that are suitable for use in the provision of snack products prepared from cooked cereal doughs. The present invention provides further improvements in the methods of preparing such cooked cereal doughs for the preparation of snack products especially fried puffed corn (maize) based snack products.

More particularly, the present invention is directed towards improved methods for preparing open ended shaped corn based fried snack products popularly marketed worldwide under the Bugles™ trademark.

Traditionally, such products are prepared by preparing a cooked cereal dough, forming the cooked cereal dough into pellets or half products of desired shape size and moisture content, and the fat frying the half products to form the finished puffed corn based snack products. Preparing the cooked cereal dough involved cooking the cereal grain material in the presence of moisture for extended times under conditions of low shear in a single vessel operated in a batch cooking mode. While useful, such grain cooking apparatus and techniques require specially designed and fabricated cookers.

Substituting twin screw extruders for such costly and specialized cereal cookers can reduce the cost of preparing the snack products and provide other advantages. Twin screw cooker extruders are economically desirable due to their high output and short residence or cooking times, and continuous operations features. However, twin screw extruders can undesirably impart high amounts of shear into the cooked cereal dough undesirably affecting the eating qualities of the finished snack products produced from such cooked cereal doughs.

The extruder's screw configuration and operating conditions can be selected to minimize the amount of shear imparted to the cereal dough. For example, the extruder can be configured to minimize the amount of time within the extruder and thus to some extent the amount of shear experienced. However, low shear and short extruder residence times can in turn lead to a problem of "white tips" within the cereal dough. White tips are small visually unappealing white spots within the cooked cereal dough, which have been incompletely cooked or dispersed within the cereal dough.

One attempt at solving the problem of white tips in cooker extruder prepared whole wheat containing cooked cereal doughs is given in U.S. Pat. No. 4,790,996 entitled "Process For Preparing Cereal Products" (issued Dec. 13, 1988 to Roush; et al.). The '996 patent teaches adding a hollow pipe to the discharge end of a cooker extruder to cook the dough more by virtue of an extended residence time thereby reducing white tips.

The present improvements reside in part in the steeping of the cereal grains under particular conditions and thereafter forming into a cooked cereal dough in a cooker extruder. The dough is next subjected to a second cooking step within a second, low shear extended residence time cooker. The cooked cereal dough is then extruded and processed by a particular sequence of steps under particular conditions. The dough is formed into desirably sized and shaped pieces or half products. The half products can be deep fat fried or otherwise finish dried and puffed to form finished corn based snack products.

SUMMARY OF THE INVENTION

Figure 1:
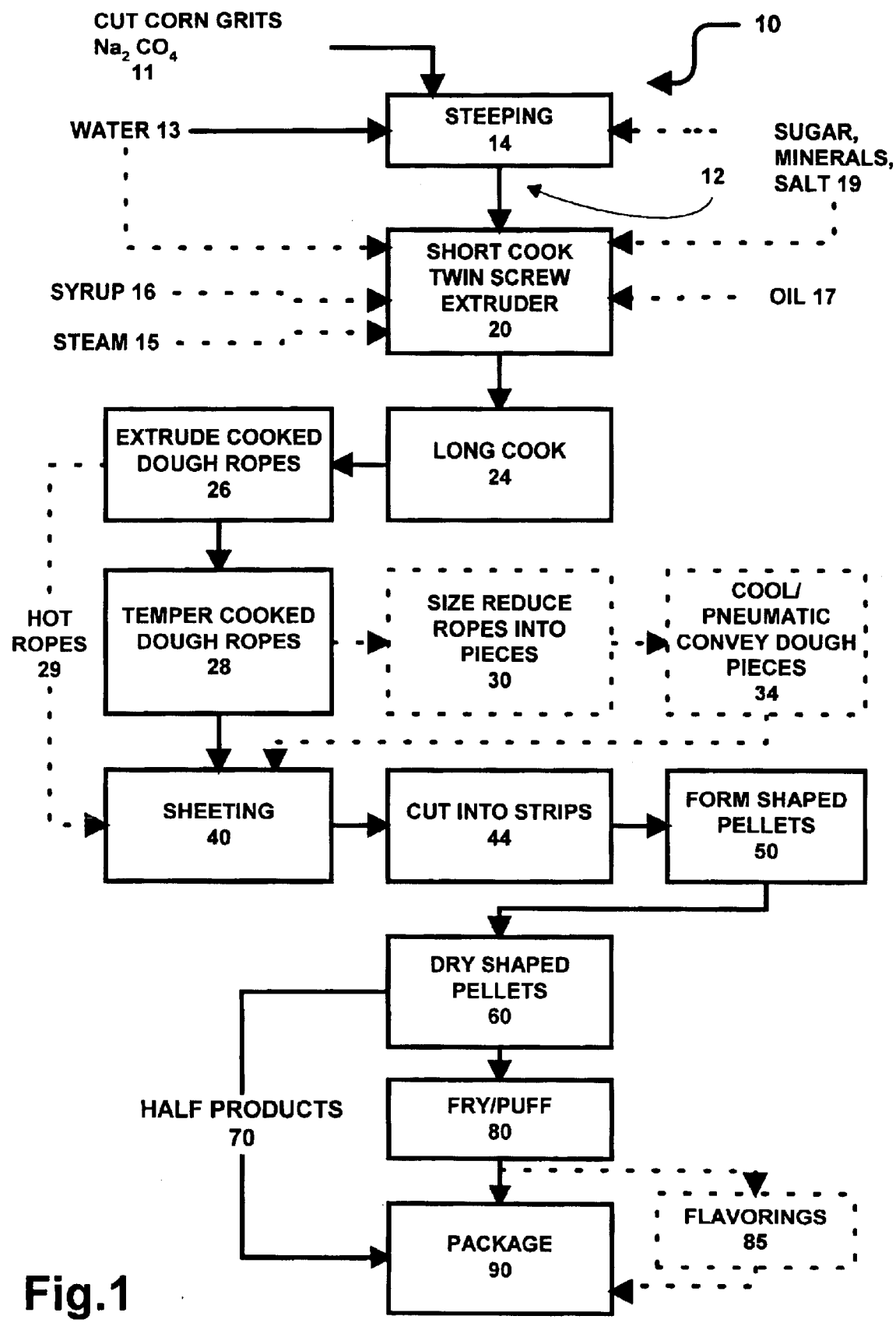
FIG. 1 is a simplified flow diagram of an embodiment of the present invention for the fabrication of snack products.

Methods for preparing puffed snack products from cooked cereal doughs, especially corn based, comprise deep fat frying cornucopia shaped pellets or half products. The present methods provide finished puffed pieces of equivalent texture and eating qualities to those prepared by traditional low shear extended cooking of grains in batch cookers.

The preparation methods comprise the steps of:

A. providing free cereal grain pieces having a particle size of about 0.5 to 2.5 mm and a moisture content of about 18% or greater;

B. cooking and forming the grain pieces into a cooked cereal mass or dough in a cooker extruder to provide a cooked cereal dough having discernible grain bits, said forming step including adding sufficient amounts of moisture to provide the cooked cereal dough with a moisture content of about 21 to 35%;

C. immediately thereafter, subjecting the cooked cereal dough to a second cooking step at a temperature of about 120 to about 194° C. (248° F. to 380° F.) for about 10 to 45 minutes to form an extended time cooked cereal mass or dough having discernible grain bits dispersed therein;

D. extruding the cooked dough into ropes;

E. cooling and tempering the cooked cereal dough ropes;

F. forming the cooked cereal dough into pellets each weighing about 0.25 to 10 g;

G. drying the pellets to a moisture content of about 8% to 14%; and,

E. rapidly heating the pellets to provide puffed finished grain based snacks.

The present process can utilize less expensive and specialized equipment, can be practiced as a continuous process rather than batch or semi-continuous, and are more economic.

DETAILED DESCRIPTION OF THE INVENTION

The present invention provides improved methods for preparing snack products prepared from cooked cereal doughs. Each of the process steps are described in detail below.

Throughout the specification and claims, percentages are by weight unless otherwise indicated.

Steeping a Raw Premix Including Cereal Grain Pieces

Referring now to the drawing, FIG. 1 illustrates a method according to the present invention generally indicated by reference numeral 10. Further, the drawing illustrates that the present methods 10 essentially comprise a first step of 20 of providing free cereal grain pieces having a moisture content of at least 18%, preferably about 20 to 30% moisture. In the drawing, optional steps are indicated by dashed lines.

This step can include a first substep of preparing a cereal premix comprising at least one, optionally at least two grain ingredients, selected from the group consisting of corn (maize), rice, wheat, oats, barley, rye, triticale and mixtures thereof. In the preferred variation, the grain of choice is corn (maize). In more highly preferred variations, the grain is corn based and comprises about 51% to about 100%, preferably about 51% to 90% corn. While in the following description, corn is the preferred and exemplified grain of choice, the skilled artisan will appreciate that the invention can be applied to other grains as well.

In a preferred variation, at least a portion of the cereal grains are "raw." By "raw" is meant, of course, guncooked or ungelatinized cereal grains. In a more preferred variation, all the grain is "raw".

Also, the corn (maize) ingredients are further essentially characterized by a particle size of generally less than a whole grain but essentially as being larger than a flour. In the preferred embodiment, the present cut grains are desirably characterized by a particle size of about 0.5 to 2.5 mm in length, preferably about 1 to 2 mm in length. Corn grain pieces within this particle size are provided by, for example, commercially available corn grits. Such a size selection is desirable for obtaining the end product eating qualities while at the same time ensuring complete cooking of the cereal so as to provide finished products exhibiting desirable organoleptic attributes. In less preferred embodiments, all or a portion of the preferred grain bit material can be substituted with an equivalent quantity of grain material in smaller particles, e.g., flours.

In certain embodiments at least a portion of one grain ingredient is supplied by a whole grain pieces or bit including the germ and bran fractions thereof.

The corn grits, for example, are received with an initial moisture content typically ranging from about 9% to 14% especially about 10% to 12%. Conveniently, the corn is stored at room temperature.

This first step can further comprise the substep of admixing sufficient amounts of water and/or moisture containing ingredients to provide the preblend with a moisture content of at least 20% to about 30%, preferably 20 to 28%. Preferably, the added water is added as hot water in order to reduce the steeping time required for equilibration. The tempering step is continued for times sufficient to allow for absorption of the added moisture and depend in part upon temperatures of the added materials, grain piece sizes and type, and agitation. Generally, however, good results are obtained when the steeping step is practiced from about 20 to 50 minutes, preferably about 30 to 40 minutes with room temperature grain and when the added water is hot.

By "hot" herein is meant a temperature of at least 65° C. (150° F.), preferably a temperature ranging between 65° C. to about 88° C. (150° F. to about 190° F.).

In the preferred embodiment, this steeping substep is practiced with gentle but sufficient agitation so as to prevent agglomeration or the formation of clumps. Good results are obtained with intermittent agitation such as a repeated cycle of 1–2 minutes of gentle agitation followed by 6–12 minutes of quiescence. This cycle can be repeated for about 15 to 30 minutes until the moisture is absorbed to form steeped or wetted cereal premix. In another variation, the agitation is continuous rather than intermittent.

The admixing and steeping steps can be conveniently practiced in a conventional mixer such as a ribbon blender.

If desired, supplemental nutritive carbohydrate sweeteners can be additionally included into the blend. Such sweeteners can comprise, for example, sucrose, fructose, glucose, corn syrup, honey, maple syrup solids, fruit juice solids, and mixtures thereof. If present, such nutritive carbohydrate sweeteners can collectively comprise about 0.1 to 25% of the cooked cereal dough (dry basis), preferably about 0.5% to about 5%.

The present cereal compositions can additionally comprise a variety of other minor ingredients intended to make the cereal compositions nutritionally, organoleptically or visually appealing. Such materials can include, for example, vitamins, mineral fortifiers (especially sufficient amounts of calcium carbonate or calcium phosphate salts to provide a total calcium content of at least 0.1% to 1% dry weight basis), salt, colors, and flavors, flavor enhancers, and mixtures thereof. If present, these materials can each comprise from about 0.1 to 2% of the composition. Conventionally, these dry materials are in powder form. As FIG. 1 illustrates, the premix can include all or a portion of these materials with the balance, if any, being added to the first cook step 30 described below.

Especially preferred for use herein is sodium bicarbonate $Na_2CO_4$. Useful concentrations of sodium bicarbonate range from about 0.1 to 0.5%.

One especially useful material is common salt. Desirably, the salt comprises about 0.1 to 4%, preferably about 0.5 to 1.0% of the cereal composition.

The first step 12 can optionally include a substep of admixing the grain ingredients with all or a portion of the optional dry optional ingredients to form a dry cereal premix blend in a conventional mixer such as a ribbon mixer.

The high moisture grain blend, with or without added ingredients, is desirably provided in "free" form. By "free" is meant in discrete pieces without excessive clumping of the grain pieces together so that the grains can be fed to the twin screw extruder in the next step.

In a preferred variation, the step does not involve further heating or cooking of the wetted grains. For example, the steeped preblend is not exposed to direct or indirect steam heating. As a result, the grains, although of higher moisture content, are not fully hydrated and are substantially ungelatinized, i.e., less than 5% of the starch is gelatinized.

The present methods essentially comprise a step of forming 20 the steeped preblend or high moisture free grain pieces so prepared into a cooked cereal mass or dough. This first cooking step 20 is practiced in a short time under conditions of low shear sufficient to provide a cooked cereal having discernible grain bits.

As is described in those references and is more well known, a cooked cereal dough can be prepared in many ways by blending or admixing various cereal ingredients together with water and cooking to gelatinize the starchy components and to develop a cooked flavor. The cooked material can then be mechanically worked to form a cooked cereal dough.

In the present first cooking step 20, the cereal is cooked with steam and sufficient amounts of added water for times and at temperatures sufficient to gelatinize the cereal starch and to provide the cooked cereal dough with a moisture content essentially ranging from about 21 to 35%. In addition to water, various liquid ingredients such as corn or malt syrups can be added. The malt syrup flavor ingredient comprises about 1 to 8% (dry basis), preferably about 2 to 5%. Supplemental sugar can be added to the syrup, if desired. However, the total sugar content of the cooked cereal dough should be less than 15%, preferably less than 12% (dry weight). For certain product variations, vegetable oil or other fat or equivalents (e.g., olestra or other sucrose polyesters) can be added to the twin screw extruder such as in amounts ranging from about) 0.1% to 5%, preferably about 0.5% to about 1%.

In a preferred embodiment, a twin screw extruder can be used to practice this first cooking step 20. A twin screw extruder can perform the mixing, heating/cooking and dough forming steps all in a single piece of equipment. As a result, a twin screw extruder provides the advantage of a practical and commercially economical technique for practicing the invention. While single screw cooker extruders are known, some of which include preconditions, single screw cooker extruders generally impart too much shear to the cooked cereal dough resulting in the undesirable eating qualities in the finished snack products.

As indicated above, if desired, however, all or a portion of some or all of the optional dry ingredients can be added to the twin screw extruder for admixture into the cooked cereal dough.

The twin screw extruder is configured to provide a short cook time, namely, a residence time on the order of 0.1 to three minutes, preferably about 15 to 30 seconds. Also, the extruder is configured to minimize the amount of shear imparted to the cooked cereal dough. The present working step is practiced to impart extremely low Specific Mechanical Energy ("SME") to the grain based material. As its name implies, SME is used to characterize the amount of mechanical energy or work that the extruder imparts to the material being worked. Conventional twin screw extruder cooking imparts about 90 to 150 W-hr./kg. (or, equivalently, 0.09 to 0.15 kW-hr./kg.) of SME to the cooked cereal dough. The present invention is practiced so as to impart less than 35 W-hr./kg. of SME to the grain based product, preferably about 0.5 to 25 W-hr./kg. of SME, preferably about 10 to 15 W-hr/kg od SME.

The temperature of the cooked cereal dough can range from about 120° C. to 195° C. (248° F. to 383° F.). The operating pressure can range from about 690 to 8300 kPa (100 to 1200 PSI), preferably 2860 to 3200 kPa 400 to 750 PSI).

The cooked cereal doughs, immediately after the first cooking step 20, typically will have a moisture content of about 21 to 35% by weight, preferably about 28 to 32% and for best results about 29 to 30%. The cooked cereal doughs are for all practical purposes completely gelatinized, i.e., a starch gelatinization of at least 95%, preferably 99%, as measured by differential scanning calorimetry.

The present methods 10 further essentially comprise immediately thereafter, the step of subjecting the cooked cereal dough having a moisture content of about 21 to 35% to a second long cooking step 24 at a temperature of about 120° C. to about 180° C. (248° F. to 356° F.) for about 10 to 45 minutes to form an extended cooked cereal.

By "immediately thereafter" herein is meant without a loss of moisture such as by exposure to atmospheric conditions. More preferably, the long cook step is practiced in less than 30 seconds after completion of short cook step 20. However, in certain variations, an intervening step such as an extrusion, conveying, pumping, compression, or holding steps can be added so long as these steps impart minimal additional shear to the cooked cereal dough and do not result in a loss of moisture. Such "immediately thereafter" processing can be conveniently accomplished by a short direct piping connection from the twin screw extruder discharge to the second cooking device with no intervening die plate or other shear imparting equipment. In one variation, the dough can be pumped from the twin screw extruder to the long residence time cooker such as by a gear pump.

In more preferred variations the step 24 is practiced in a manner further characterized by no venting or loss of moisture from the dough. In even more preferred variations, no further additions of materials to the cooked cereal dough are made.

A cooking device suitable for use herein to practice the second cooking step is a double jacketed horizontally extending cylindrical vessel including internal transporting means such as an Archimedes screw. Such a device is described, for example in the U.S. Pat. No. 5,997,934 entitled "Manufacture of Cooked Cereals" (Dec. 7, 1999) and which is incorporated herein by reference.

While not critical per se, the cooking device described employs a rotational speed of about 1–10 rpm.

The residence time of the cooked cereal dough with the second cooking device ranges from about 10 to 45 minutes, preferably about 15 to 35 minutes and for best results about 25 minutes.

Although the vessel therein described can be operated to provide supplemental heating, in the preferred operation of the present methods, no supplemental heat is supplied.

The cooked cereal dough entering the second cooking step is in the preferred embodiment essentially fully gelatinized. The second cooking step is employed primarily for flavor development.

Due to the slow rotational speed and the nature of the screw configuration, extremely low shear is imparted to the cooked dough during the second cooking step due to vessel construction and operation.

The dough exiting has a more fully developed flavor, exhibits few, if any white tips, but nonetheless retains a desirable number of discernible grain bits. Since no moisture loss during the second cooking step, the moisture content ranges from about 21 to 32%, preferably about 27 to 30%. Immediately prior to extruding, to the cooked cereal dough can be to at a temperature ranging from about 126.6 to 182.2° C. (260° F. to about 360° F.).

The present methods 10 further essentially include the step of extruding 26 the cooked cereal dough into dough ropes. In one preferred variation, step 26 can include the step of extruding the cooked dough through a die plate having a plurality of dies to form extrudate ropes. For example, a die plate having a 2 to 10 inch diameter can be fabricated to have about 5 to 50 dies, each about 3 mm to 20 mm in diameter. A larger die is preferred since larger dies develop less back pressure and less back pressure results in less shear.

The cooked cereal dough can exhibit some swelling or minor expansion upon extrusion but is not puffed such as occurs during the direct expansion method of forming finished grain based cereal pieces.

Thereafter, in the preferred embodiment, the present methods essentially comprise the step of cooling 28 the extruded cooked cereal dough to provide a cooled cooked cereal dough for sheeting step 40. In the preferred embodiment, prior to sheeting step 40, the dough is cooled to about 54.4 to 76.6° C. (130° F. to 170° F.). In a less preferred embodiment (depicted in FIG. 1 by dashed lines) hot ropes 29 are feed directly to sheeting step 40 having temperatures ranging from about 77 to 87.8° C. (171° F. to 190° F.).

In the preferred embodiment, step 28 can involve a first tempering substep that is relatively short in duration and can range from about 0.1 to 5 minutes. Conveniently, the tempering substep can be practiced by employing take-away conveyor belts that transports the extrudate dough ropes away from the cooker equipment. During to tempering substep, the dough ropes can complete a portion of the desirable cooling and cool modestly from their temperature at extrusion of about 100° C. to 93.3° C. (212° F. to about 200° F.).

The step 28 can further comprise the substep of size reducing the tempered cooked cereal dough ropes into pieces 30. The ropes can be broken into pieces or chunks that are about 2–8 mm in diameter or largest dimension such as by using a common hammermill. During the size reduction substep, the cooked cereal dough undergoes further cooling.

Thereafter, the step 28 can further comprise a substep of conveying 34 the dough pieces to sheeting step 40. Conveniently, the dough pieces can be pneumatically conveyed 34 to the sheeting rolls used to practice the sheeting step 40. Pneumatic conveyance can desirably further cool the pieces to complete the desired cooling to the range of about 43.3° C. to 54.4 (110° F. to about 130° F.) before sheeting step 40.

The present methods further comprise the step of sheeting 40 the cooked cereal dough. The dough pieces can be formed into sheets using sheeting rolls. In preferred embodiments, the sheeting rolls form a continuous sheet having a sheet thickness ranging from about 1 to 4 mm.

The cooled dough sheet is next formed 44 into strips or continuous ribbons of cooked cereal dough in two layers. For example, the sheets can first be cut into ribbons such as by cutting. The present methods can further comprise aligning the strips into overlaying pairs and then feeding the aligned dough strips into pellet fomers. In other variations, the sequence of substeps is reversed and dough sheets coming out of the dough forming rolls can be first folded into aligned layers and then the two ply folded sheet cut into continuous ribbons of two layers of cooked dough.

The methods further essentially comprise forming 50 the dough sheets or aligned ribbons into suitably shaped and sized pellets for example, biscuits, spirals, cornucopias, figurines and various geometric shapes. In one variation, the pellets are in the form of strips having a width of about 10 to 25 mm and a length of about 30 to 60 mm. In other variations, the dough pellets can be in the form of wafers, disks or oval. Such shapes are popular for various corn chip type of finished snack products.

In the preferred embodiment, the dough is formed into cornucopia or open ended three dimensional pellets. Snack products made from pellets of this distinctive shape enjoy worldwide commercial success under the Bugles™ trademark. Suitable for use to form shaped pellets are the apparatus and techniques described in U.S. Pat. No. 3,279,398 (issued Oct. 18, 1966 to V. E. Weiss) entitled "Dough Forming Machine and Process" and U.S. Pat. No. 3,310,006 (issued Mar. 21, 1967 to M Hasten et al.) entitled "Dough Forming Machine and Process" each of which is incorporated herein by reference. While useful to practice the pellet shaping step 50, in the preferred embodiment, improved equipment and techniques are employed that are described in commonly assigned copending application entitled "Dough Forming Apparatus and Method," Ser. No. 09/415,615, filed in the name of William Bornhorst et al. on Oct. 8, 1999 and incorporated herein by reference. The apparatus therein described comprises rotary cutter rolls for receiving multiple strips of dough for forming into dough into shaped and sized dough individual pieces pellets each weighing about 0.25 to 10 g.

Drying the Pellets

Thereafter, the present snack preparation methods 10 essentially comprise the step of drying 60 the pellets prior to provide dried pellets or snack half products having a moisture content of about 10 to 22%, preferably 12 to 20%.

Conventional drying techniques and apparatus can be used to practice the present drying step. Conveniently, the pellets are subjected to a forced hot air drying step with air temperatures of 82.2 to 121.1° C. (180 to 250° F.) until within the desired moisture content range. Typical drying times range from 10 to 20 minutes, preferably about 15 minutes.

The method can then further comprise drying the pellets 260 to form dried pellets having a moisture content of about 7 to 14% by weight. These pellets or half products 70 are then suitable for use as an intermediate product in the fabrication of finished snack pieces. As such, the pellets can be packaged 70, for example, in large carton totes. Conveniently, the half product pellets can be fabricated in a single large scale production facility. Due to their shelf stability, the pellets can be shipped from the central manufacturing location to a wide variety of finish operations. The half products, being unpuffed, are more convenient to transport. Not only are the pellets of lower volume, but also are less subject to damage in transit. When the pellets are shipped closer to the final market, the pellets can then be fried to form the finished fried, puffed snack pieces.

In the preferred embodiment, the dough pellets are preferably free of any added leavening ingredients.

Methods 10 can further include finishing step for forming the half products or pellets into a finished grain based snack. For example, the pellets can be expanded and dried by deep fat frying 80 to provide puffed, fried grain based snack products having a moisture content of under 2% and a fat content of about 1 to 35%, preferably about 15 to 35% by weight (for example when prepared by deep fat frying). In other variations, e.g., for the production of corn chips, the deep fat frying does not cause puffing of the finished food product although some expansion might occur.

The finished puffed snacks can then be packaged 90 in conventional manner such as in individual packages containing finished fried snack products in amounts weighing 20 to 500 g.

The snack pieces fabricated from the cooked cereal doughs herein can then be, if desired (not shown), further seasoned by the topical application of salt, seasonings or flavors (e.g., barbecue, sour cream, bacon, onion, etc.), dried cheeses and packaged for distribution and sale.

If desired, the method can further comprise a pellet heating substep (not shown) prior to the deep fat frying, e.g. to about 71 to 83° C. (160 to 180° F.) immediately prior to the frying step. Such preheating ensures that the pellets are at a temperature suitable for the subsequent frying step. In certain variations, such preheating steps can reduce the amount of fat absorption during the frying step.

In other variations, the puffing step can involve rapid heating such as with fluidized beds of hot air or microwave heating. If puffed using such non frying heating steps, the post puffing processing can involve applying a fat topically (e.g., about 1% to 10%). Such topical fat application not only improves the eating qualities but also can improve the adhesion of any topically applied seasoning such as salt.

Thereafter, the finished dried flaked R-T-E products of the present invention can be conventionally packaged and distributed. The finish products exhibits equivalent texture to those products made by prior processes involving long cook batch cookers.

The half products can be fried, air puffed or otherwise formed 290 into finished snack products. After topical seasoning, if desired, the so formed finished snack products of the present invention can be conventionally packaged for distribution and sale.

The snack products so formed exhibit desirable organoleptic attributes, especially eating quality.

If desired, the present methods 10 can further include the step of providing a presweetener or sugar coating to the puffed pieces prepared by non deep fat frying techniques. Providing a sugar coating can involve the substeps of forming a sugar coating or presweetening syrup or slurry and enrobing or otherwise applying a presweetener coating syrup or slurry to the puffed pieces to form slurry coated puffed pieces. Sufficient amounts of sugar coating are applied to provide the puffed pieces with a sugar coating to cereal base ranging from about 2:100 to about 50:100 (dry basis).

If desired, heat sensitive vitamins can be added to or with the sweetener coating slurry.

Thereafter, the slurry coated puffed pieces can be finish dried to remove the moisture added by the sugar coating slurry to provide sugar coated finished pieces having a moisture content of about 2 to 5%. In variations that involve applying a low moisture sugar coating solution, the finish drying step might not be necessary.

In other variations, all or a portion of the nutritive carbohydrate sweeteners can be substituted with high potency sweeteners such as aspartame at equivalent sweetness levels.

In other variations, the finish snack products, whether or not presweetened, can be admixed with a variety of added ingredients such as raisins, nuts, pretzels, ready-to-eat cereals of various compositions and forms, dried marshmallow, dried fruit pieces, other fried snacks products, and mixtures thereof. Such blends of various snack products or snack mixes are increasingly popular. The present puffed snack products can comprise about 10% to about 80% of such snack product blends. As noted above, while the present invention is directed primarily towards the provision of fried snack products fabricated from the present cooked cereal doughs, the skilled artisan will appreciate that the present cooked cereal doughs are useful intermediate products that can also be used to provide a wide variety of grain snacks and other cooked cereal dough products.

What is claimed is:

1. A method of preparing a snack product from a cooked cereal dough, comprising the steps of:
    A. providing free cereal grain pieces having a particle size of about 0.5 to 2.5 mm and a moisture content of at least 18%;
    B. cooking and forming the grain pieces into a cooked cereal dough in a cooker extruder in a first cooking step at a temperature sufficient to gelatinize cereal starch in the grain pieces to provide an at least partially cooked cereal dough having discernible grain bits from the free cereal grain pieces of step A, said forming step including adding sufficient amounts of moisture to provide the cooked cereal dough with a moisture content of about 21 to 35%; and
    C. immediately thereafter, subjecting the cooked cereal dough to a second cooking step at a temperature of about 120 to about 194° C. (248 to 380° F.) for about 15 to 45 minutes to form an extended time cooked cereal dough having said discernible grain bits dispersed therein.

2. The method of claim 1 additionally comprising the steps of:
    forming the cooked cereal dough into pellets each weighing about 0.25 to 10 g; and drying the pellets to a moisture content of about 8% to 14%.

3. The method of claim 2 additionally comprising the step of:
    rapidly heating the pellets to provide puffed finished grain based snacks.

4. The method of claim 3 wherein the rapid heating includes deep fat frying to provide fried puffed grain based snacks having a fat content of about 15 to 40% by weight.

5. The method of claim 3 wherein the finished puffed grain based snacks have a fat content of about 25% to 35%.

6. The method of claim 3 additionally comprising the step of applying a topical seasoning to the puffed finished grain based snack.

7. The method of claim 6 wherein steps B and C are practiced to provide the dough with a Specific Mechanical Energy ("SME") value of about 10 to 25 watt-hours/kg of cooked dough.

8. The method of claim 3 wherein the rapid heating includes microwave heating.

9. The method of claim 3 wherein the rapid heating includes hot air puffing.

10. The method of claim 3 wherein the rapid heating includes deep fat frying.

11. The method of claim 3 additionally comprising the step of applying a topical coating to the puffed finished grain based snacks.

12. The method of claim 1 wherein step A comprises the substeps of:
    1) preparing a raw cereal premix comprising at least one grain ingredient selected from the group consisting of wheat, corn (maize), oats, rye, triticale and mixtures thereof;
    2) admixing sufficient amounts of water and/or hot moisture containing ingredients to provide a wetted preblend with a moisture content of at least 18%, and
    3) steeping the wetted preblend until the added moisture is absorbed.

13. The method of claim 12 wherein the steeping substep is performed with intermittent agitation.

14. The method of claim 13 additionally comprising the step of extruding the extended time cooked cereal dough into at least one dough rope extrudate.

15. The method of claim 14 wherein Step B is practiced in a twin screw extruder and has a duration of about 0.1 to 3 minutes.

16. The method of claim 15 wherein step C is practiced in a cooker having an Archimedes screw operated at about 1–10 rpm for about 15 to 45 minutes.

17. The method of claim 1 wherein the cereal grain includes corn (maize).

18. The method of claim 1 wherein steps B and C are practiced to provide the dough with a Specific Mechanical Energy ("SME") value of less than 35 watt-hours/kg of dough.

19. The method of claim 18 wherein the cooked cereal dough includes sufficient amounts of nutritive carbohydrate ingredients to provide a total sugar content of about 1 to 15% (dry weight).

20. The method of claim 18 wherein the dough includes a member selected from the group consisting of sugar(s), salt, minerals, vitamins, flavors, sodium bicarbonate, and mixtures thereof.

21. The method of claim 1 wherein step B is practiced in a twin screw extruder.

22. The method of claim 1 additionally comprising the step of: sheeting the extended time cooked cereal dough to form a continuous cooled and tempered extended time cooked cereal dough sheet.

* * * * *